US008493542B2

(12) United States Patent
Nishi et al.

(10) Patent No.: US 8,493,542 B2
(45) Date of Patent: Jul. 23, 2013

(54) METHOD AND SYSTEM FOR FABRICATING LIQUID CRYSTAL CELLS

(75) Inventors: Takeshi Nishi, Kanagawa (JP); Satoshi Teramoto, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 506 days.

(21) Appl. No.: 11/023,549

(22) Filed: Dec. 29, 2004

(65) Prior Publication Data

US 2005/0105039 A1 May 19, 2005

Related U.S. Application Data

(62) Division of application No. 09/983,112, filed on Oct. 23, 2001, now Pat. No. 6,839,123, which is a division of application No. 09/357,827, filed on Jul. 21, 1999, now Pat. No. 6,320,640, which is a division of application No. 08/566,143, filed on Dec. 1, 1995, now Pat. No. 5,929,961.

(30) Foreign Application Priority Data

Jan. 11, 1995 (JP) ..................................... 7-018713

(51) Int. Cl.
*G02F 1/1339* (2006.01)

(52) U.S. Cl.
USPC ........................................................ 349/190

(58) Field of Classification Search
USPC ........................... 349/43, 187, 189, 190, 155
See application file for complete search history.

(56) References Cited

U.S. PATENT DOCUMENTS

| | | | | | |
|---|---|---|---|---|---|
| 3,977,767 | A | * | 8/1976 | Okuma et al. | 349/123 |
| 4,094,058 | A | | 6/1978 | Yasutake et al. | |
| 5,150,035 | A | * | 9/1992 | Nose et al. | 324/71.1 |
| 5,162,934 | A | * | 11/1992 | Gunjima et al. | 349/93 |
| 5,238,523 | A | * | 8/1993 | Yuasa et al. | 156/517 |
| 5,263,888 | A | * | 11/1993 | Ishihara et al. | 445/25 |
| 5,270,229 | A | * | 12/1993 | Ishihara | 438/158 |
| 5,307,190 | A | * | 4/1994 | Wakita et al. | 349/158 |
| 5,358,810 | A | | 10/1994 | Yoshino | |
| 5,390,037 | A | | 2/1995 | Negishi | |
| 5,410,423 | A | * | 4/1995 | Furushima et al. | 349/190 |
| 5,420,708 | A | | 5/1995 | Yokoyama et al. | |
| 5,446,569 | A | * | 8/1995 | Iwai et al. | 349/124 |

(Continued)

FOREIGN PATENT DOCUMENTS

| | | |
|---|---|---|
| JP | 54-011119 | 1/1979 |
| JP | 56-048612 | 5/1981 |

(Continued)

OTHER PUBLICATIONS

Office Action of the U.S. Appl. No. 10/968,953 dated Apr. 4, 2007.

(Continued)

*Primary Examiner* — James Dudek
(74) *Attorney, Agent, or Firm* — Nixon Peabody LLP; Jeffrey L. Costellia

(57) ABSTRACT

Techniques for successively fabricating liquid crystal cells at low cost, using two resinous substrates wound on their respective rolls. A color filter and an electrode pattern are formed by printing techniques. Furthermore, an orientation film is printed. These manufacturing steps are carried out successively by rotating various rolls.

58 Claims, 1 Drawing Sheet

U.S. PATENT DOCUMENTS

| | | | | |
|---|---|---|---|---|
| 5,558,732 | A | | 9/1996 | Hamon |
| 5,568,292 | A | | 10/1996 | Kim |
| 5,657,408 | A | | 8/1997 | Ferm et al. |
| 5,672,296 | A | | 9/1997 | Shen et al. |
| 5,682,218 | A | | 10/1997 | Shimizu et al. |
| 5,686,019 | A | * | 11/1997 | Nakamura ............... 252/299.01 |
| 5,757,456 | A | * | 5/1998 | Yamazaki et al. ............ 349/151 |
| 5,783,289 | A | * | 7/1998 | Suzuki et al. .............. 428/195.1 |
| 5,929,961 | A | | 7/1999 | Nishi et al. |
| 6,320,640 | B2 | | 11/2001 | Nishi et al. |
| 6,791,144 | B1 | * | 9/2004 | Fryer et al. .................... 257/349 |
| 6,835,583 | B2 | * | 12/2004 | Yi et al. .......................... 438/30 |

FOREIGN PATENT DOCUMENTS

| | | | |
|---|---|---|---|
| JP | 58-140718 | | 8/1983 |
| JP | 60-087313 | | 5/1985 |
| JP | 62-150218 | | 7/1987 |
| JP | 62-168114 | | 7/1987 |
| JP | 02-210417 | | 8/1990 |
| JP | 03-078728 | | 4/1991 |
| JP | 03102316 | * | 4/1991 |
| JP | 03246514 | * | 11/1991 |
| JP | 04-083228 | * | 3/1992 |
| JP | 04070894 | * | 3/1992 |
| JP | 04-342905 | | 11/1992 |
| JP | 04-347819 | | 12/1992 |
| JP | 05-088136 | | 4/1993 |
| JP | 05-127179 | | 5/1993 |
| JP | 05-281557 | | 10/1993 |
| JP | 5-281557 | * | 10/1993 |
| JP | 05-303067 | | 11/1993 |
| JP | 05-313113 | | 11/1993 |
| JP | 05-333201 | | 12/1993 |
| JP | 06-110059 | | 4/1994 |
| JP | 6-118361 | | 4/1994 |
| JP | 06-118361 | | 4/1994 |
| JP | 6-148657 | * | 5/1994 |
| JP | 06-273617 | | 9/1994 |
| JP | 07-333595 | | 12/1995 |
| JP | 02-216125 | | 8/1999 |
| WO | WO-85/02915 | | 7/1985 |

OTHER PUBLICATIONS

Pending Claims of the U.S. Appl. No. 10/968,953 as of Jan. 12, 2007.

Fourth Office Action issued Jan. 16, 2009 in counterpart Chinese Patent Application No. 200610095944.7 filed Jan. 10, 1996, along with English translation.

* cited by examiner

METHOD AND SYSTEM FOR FABRICATING LIQUID CRYSTAL CELLS

This is a Division of U.S. application Ser. No. 09/983,112, filed Oct. 23, 2001, now U.S. Pat. No. 6,839,123.

U.S. application Ser. No. 09/983,112, filed Oct. 10, 2001 is a Division of U.S. application Ser. No. 09/357,827, filed Jul. 21, 1999, now U.S. Pat. No. 6,320,640.

U.S. application Ser. No. 09/357,827, filed Jul. 21, 1999 is a Division of U.S. application Ser. No. 08/566,143, filed Dec. 1, 1995, now U.S. Pat. No. 5,929,961.

BACKGROUND OF THE INVENTION

1. Field of the Invention

The present invention relates to a method of fabricating liquid-crystal electrooptical devices using flexible film substrates and also to a system for fabricating such liquid-crystal electrooptical devices using flexible film substrates.

2. Description of the Related Art

A liquid-crystal electrooptical device is known as a thin, small-sized, lightweight display device. The liquid-crystal electrooptical device comprises a pair of substrates spaced several micrometers from each other and a liquid crystal material held between the substrates. The substrates are required to transmit visible light and so glass substrates are generally used as the substrates. The glass substrates have the required optical characteristics. In addition, they are inexpensive.

The liquid-crystal electrooptical device must meet the following technical requirements: (1) It is small in size and lightweight; and (2) the cost of fabricating the liquid-crystal electrooptical device is reduced and its productivity is improved.

Of these requirements, the requirement (1) is that the liquid-crystal electrooptical device is made thinner and lighter in weight. A known configuration which satisfies these requirements uses resinous substrates (generally known also as plastic substrates) transmitting light.

Where resinous substrates are employed, reductions in size and weight can be accomplished. Since the substrates themselves have flexibility, a physical stress can be applied to them, or they can be used in a curved state. These kinds of usage can further extend the application of the liquid-crystal electro-optical device.

However, where resinous substrates are used, a reduction in fabrication cost and an improvement in the productivity are not accomplished.

SUMMARY OF THE INVENTION

It is an object of the present invention to provide techniques for fabricating liquid-crystal electrooptical devices, using flexible substrates, at low cost and with high productivity.

A system for fabricating liquid crystal cells according to the present invention comprises a first roll on which a first flexible substrate has been wound, a second roll on which a second flexible substrate has been wound, means for forming a liquid crystal material layer on the surface of the first substrate, and means for bonding together the first and second substrates 206, 201.

A specific example of the structure of the above-described system is shown in FIG. 1, where a first flexible substrate 206 has been wound on a first roll 119. A second flexible substrate 201 has been wound on a second roll 101. A dripping device 135 acts to drip a liquid crystal material onto the surface of the first substrate 206. A set of rolls, 137 and 138, is the means for bonding together the first and second substrates 206, 201.

The flexible substrates can be made from PET (polyethylene terephthalate), PEN (polyethylene naphthalate), PES (poly-ethylene sulfite), polyimide, or PAR (polyarylate).

A method of fabricating liquid crystal cells according to the present invention consists of preparing a first flexible substrate wound on a first roll, preparing a second flexible substrate wound on a second roll, and squeezing a liquid crystal material between the first and second substrates to form an elongated liquid crystal cell.

Another method of fabricating liquid crystal cells according to the present invention consists of winding a flexible substrate on a roll, printing an orientation film on the substrate, orienting molecules of the orientation film, spraying spacers on the orientation film, and printing a sealing material. These manufacturing steps are effected successively.

A specific example of the above-described method is illustrated in FIG. 1. An orientation film 209 is formed on the flexible substrate 206 by rolls 127 and 128, the substrate 206 being wound on the roll 119. Spacers 211 are sprayed. A sealing material (not shown) is printed.

Other objects and features of the invention will appear in the course of the description thereof, which follows.

DETAILED DESCRIPTION OF THE PREFERRED EMBODIMENT

Figure 1:
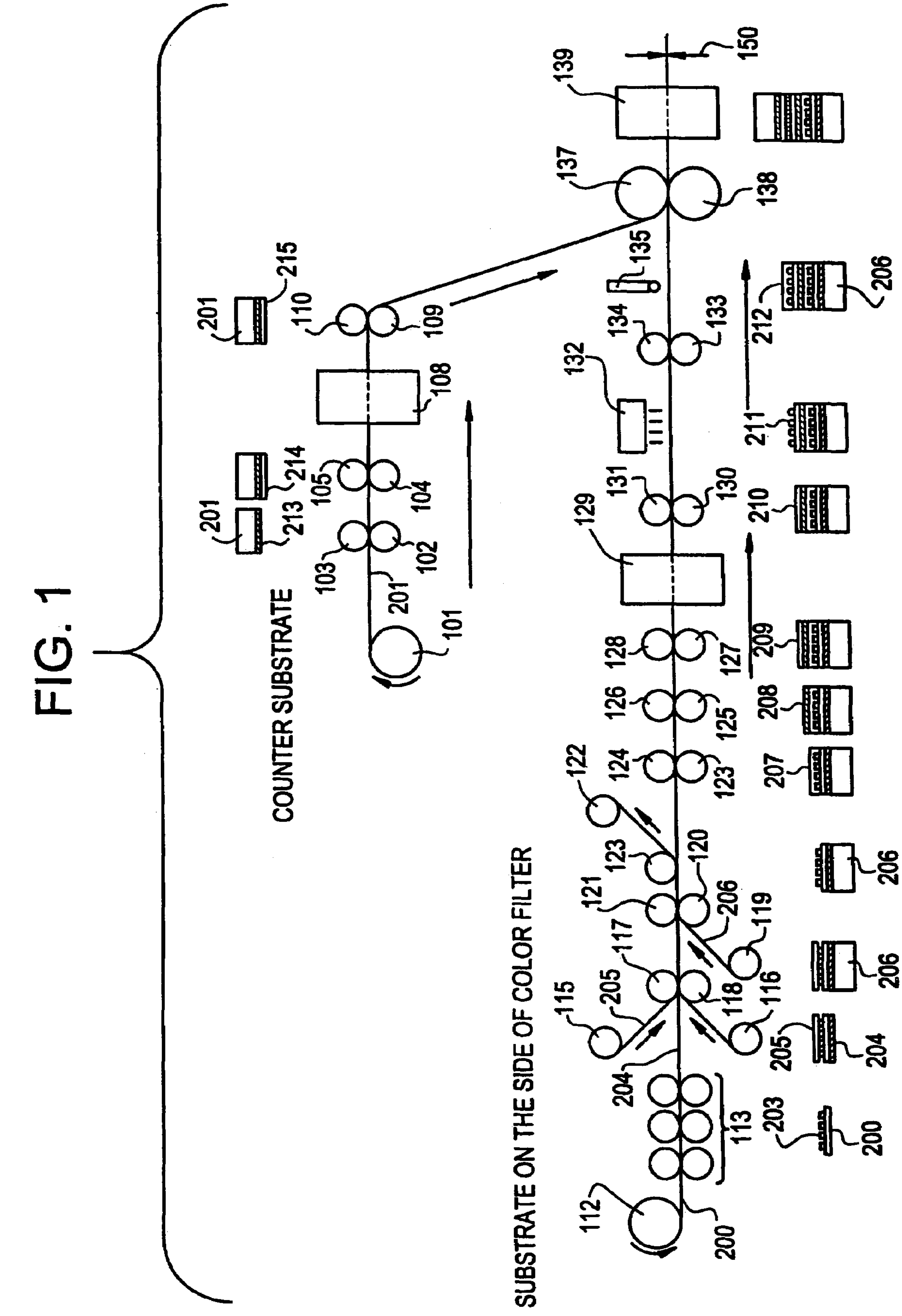
FIG. 1 is a schematic diagram of a system for fabricating liquid-crystal electrooptical devices according to the present invention.

The present example is a production system capable of producing liquid-crystal electrooptical devices in succession, each electrooptical device using flexible resinous substrates. This fabrication system is schematically shown in FIG. 1 and intended to produce the flexible resinous substrates wound on rolls 101 and 119, for constructing each liquid-crystal electrooptical device.

First, a manufacturing step regarding resinous substrates wound around the roll 119 is described. In this example, resinous substrate coiled around the roll 119 consist of film of PET (polyethylene terephthalate). A three-colored (R, G, and B) filter 203 is printed on the surface of the RET film 200 drawn out of the roll 112. This PET film acts as a base in forming the color filter 203. The color filter 203 is formed by means of three sets of rolls 113. Where the manufactured liquid crystal display is a monochrome display, these three sets of rolls are not necessary.

After forming the color filter 203, a protective film 205 wound on a roll 115 is formed so as to cover the color filter 203 previously formed. A self-adhesive film 204 wound on a roll 116 is stuck on the rear side of the base, i.e., on the opposite side of the surface on which the colored filter is formed. This series of manufacturing steps is performed, using a pair of pressure rolls, 117 and 118.

Then, another PET film 206 which is wound on the roll 119 and forms a base is stuck via the self-adhesive film 204 by means of a set of pressure rolls, 120 and. 121. Subsequently, the protective film 205 is peeled off by a roll 123 and wound on a roll 122.

Thereafter, an overcoat film 207 is printed by a set of rolls, 123 and 124, to flatten the irregularities created by the formation of the color filter 203. This overcoat film 207 is made from a resinous material transparent to light.

A required electrode pattern 208 is printed, using a set of rolls, 125 and 126. The electrode pattern 208 is made from a conductive ink.

Then, an orientation film 209 is printed by the use of a set of rolls, 127 and 128. The orientation film 209 is passed through a heating furnace 129 to bake it. As a result, a solidified orientation film 210 is obtained.

The orientation film 210 is passed between rolls 130 and 131 to rub the surfaces of the orientation film 210. In this way, the molecules of the film are oriented. Then, spacers are sprayed from a spacer dispenser 132 to place the spacers 211 on the oriented film 210.

Thereafter, a sealing material (not shown) is printed to bond together opposite substrates and to prevent the liquid crystal material from leaking from the spacing between the substrates.

Subsequently, the liquid crystal material is dripped, using the liquid crystal material-dripping device 135, to form a liquid crystal material layer 212. In this manner, one substrate is completed. The manufacturing steps described thus far are successively carried out by rotating the various rolls.

The other substrate is manufactured in the manner described below. A desired electrode pattern 213 is formed on the PET film 201 drawn out of the roll 101 by a pair of rolls 102 and 103. Then, an orientation film 214 is printed through the use of a pair of rolls 104 and 105. The film is baked by a heating furnace 108, so that a solidified orientation film 215 is formed. Thereafter, the substrate is passed between a pair of rolls 109 and 110 and guided to the rolls 137 and 138 to form a cell.

The liquid crystal cell is formed on the PET film pair by the steps described thus far. This PET film pair is passed between a pair of rolls 137 and 138 to bond together the films, using a sealing material.

Then, heating is done within a heating furnace 139 to cure the sealing material, thus completing bonding of the substrates. The resulting substrate assembly is cut into desired size with a cutter 150. In this way, a liquid crystal cell is completed.

The manufacturing steps described thus far are performed in succession by rotating the various rolls. By cutting the substrate assembly with the cutter 150, liquid crystal cells are successively fabricated.

In the present example, passive liquid crystal cells are manufactured. It is also possible to fabricate active liquid crystal cells by fabricating nonlinear devices and TFTs simultaneously by printing techniques.

In the present example, liquid crystal cells are formed on PET films which are industrially often used like magnetic tape. Besides PET, PEN (polyethylene naphthalate), PES (polyethylene sulfite), polyimide, and PAR (polyarylate) can be used.

Where PET or PES film is used, birefringence may take place, in which case the image displayed on the device may be adversely affected. On the other hand, neither PES film nor PAR film induces birefringence and they satisfy the optical characteristics which every display device must meet.

In the present invention, when flexible liquid crystal cells are manufactured, flexible substrates wound on rolls are used. Consequently, liquid crystal cells can be manufactured in succession.

What is claimed is:

1. A method for manufacturing a display device comprising:

forming an electrode pattern over a first substrate;

forming an orientation film over the electrode pattern;

forming spacers over the first substrate;

forming a sealing material over the first substrate;

dripping a liquid crystal material onto the orientation film to form a liquid crystal layer inside the sealing material after forming the spacers;

completely closing the liquid crystal layer and the sealing material with a second substrate after dripping the liquid crystal material so that a space surrounded by the first substrate, the second substrate and the sealing material is filled with the liquid crystal material; and cutting the first substrate and the second substrate after attaching the second substrate to the first substrate.

2. The method according to claim 1, wherein the method further comprises a step of heating the orientation film.

3. The method according to claim 1, wherein the method further comprising a step of forming TFTs by printing.

4. The method according to claim 1, wherein the electrode pattern is formed by printing.

5. The method according to claim 1, wherein the orientation film is formed by printing.

6. A method for manufacturing a display device comprising:

forming an electrode pattern over a first substrate;

forming an orientation film over the electrode pattern;

forming spacers over the first substrate;

forming a sealing material over the first substrate;

dripping a liquid crystal material onto the orientation film to form a liquid crystal layer inside the sealing material after forming the spacers; and completely closing the liquid crystal layer and the sealing material with a second substrate after dripping the liquid crystal material so that a space surrounded by the first substrate, the second substrate and the sealing material is filled with the liquid crystal material.

7. The method according to claim 6, wherein the method further comprises a step of heating the orientation film.

8. The method according to claim 6, wherein the method further comprising a step of forming TFTs by printing.

9. The method according to claim 6, wherein the electrode pattern is formed by printing.

10. The method according to claim 6, wherein the orientation film is formed by printing.

11. A method for manufacturing a display device comprising:

forming an electrode pattern over a first substrate;

forming an orientation film over the electrode pattern;

forming spacers over the first substrate;

forming a sealing material over the first substrate;

curing the sealing material by heating;

dripping a liquid crystal material onto the orientation film to form a liquid crystal layer inside the sealing material after forming the spacers;

completely closing the liquid crystal layer and the sealing material with a second substrate after dripping the liquid crystal material so that a space surrounded by the first substrate, the second substrate and the sealing material is filled with the liquid crystal material; and cutting the first substrate and the second substrate after attaching the second substrate to the first substrate.

12. The method according to claim 11, wherein the method further comprises a step of heating the orientation film.

13. The method according to claim 11, wherein the method further comprising a step of forming TFTs by printing.

14. The method according to claim 11, wherein the electrode pattern is formed by printing.

15. The method according to claim 11, wherein the orientation film is formed by printing.

16. The method according to claim 1, wherein the sealing material is formed by printing.

17. The method according to claim 6, wherein the sealing material is formed by printing.

18. The method according to claim 11, wherein the sealing material is formed by printing.

19. A method for manufacturing a display device comprising:

forming a color filter over a first substrate;

forming spacers over the first substrate;

forming a sealing material over the first substrate;

dripping a liquid crystal material over the first substrate to form a liquid crystal layer inside the sealing material after forming the spacers;

completely closing the liquid crystal layer and the sealing material with a second substrate after dripping the liquid crystal material so that a space surrounded by the first substrate, the second substrate and the sealing material is filled with the liquid crystal material; and cutting the first substrate and the second substrate after attaching the second substrate to the first substrate.

20. The method according to claim 19, wherein the color filter is formed by printing.

21. The method according to claim 19, wherein the sealing material is formed by printing.

22. A method for manufacturing a display device comprising:

forming a color filter over a first substrate;

forming an overcoat film over the color filter applying spacers over the first substrate;

forming a sealing material over the first substrate;

dripping a liquid crystal material over the first substrate to form a liquid crystal layer inside the sealing material after forming the spacers;

completely closing the liquid crystal layer and the sealing material with a second substrate after dripping the liquid crystal material so that a space surrounded by the first substrate, the second substrate and the sealing material is filled with the liquid crystal material ; and cutting the first substrate and the second substrate after attaching the second substrate to the first substrate.

23. The method according to claim 22, wherein the color filter is formed by printing.

24. The method according to claim 22, wherein the sealing material is formed by printing.

25. The method according to claim 22, wherein the overcoat film is formed by printing.

26. A method for manufacturing a display device comprising:

forming an electrode pattern over a first substrate by printing;

forming an orientation film over the electrode pattern by printing;

forming spacers over the first substrate;

forming a sealing material over the first substrate;

dripping a liquid crystal material onto the orientation film to form a liquid crystal layer inside the sealing material after forming the spacers;

completely closing the liquid crystal layer and the sealing material with a second substrate after dripping the liquid crystal material so that a space surrounded by the first substrate, the second substrate and the sealing material is filled with the liquid crystal material; and cutting the first substrate and the second substrate after attaching the second substrate to the first substrate.

27. A method for manufacturing a display device comprising:

forming an electrode pattern over a first substrate by printing;

forming an orientation film over the electrode pattern;

forming spacers over the first substrate;

forming a sealing material over the first substrate by printing;

dripping a liquid crystal material onto the orientation film to form a liquid crystal layer inside the sealing material after forming the spacers;

completely closing the liquid crystal layer and the sealing material with a second substrate after dripping the liquid crystal material so that a space surrounded by the first substrate, the second substrate and the sealing material is filled with the liquid crystal material; and cutting the first substrate and the second substrate after attaching the second substrate to the first substrate.

28. A method for manufacturing a display device comprising:

forming an electrode pattern over a first substrate;

forming an orientation film over the electrode pattern by printing;

forming spacers over the first substrate;

forming a sealing material over the first substrate by printing;

dripping a liquid crystal material onto the orientation film to form a liquid crystal layer inside the sealing material after forming the spacers;

completely closing the liquid crystal layer and the sealing material with a second substrate after dripping the liquid crystal material so that a space surrounded by the first substrate, the second substrate and the sealing material is filled with the liquid crystal material; and cutting the first substrate and the second substrate after attaching the second substrate to the first substrate.

29. A method for manufacturing a display device comprising:

forming a color filter over a first substrate;

forming an electrode pattern over the first substrate;

forming spacers over the first substrate;

forming a sealing material over the first substrate after forming the spacers;

dripping a liquid crystal material over the first substrate to form a liquid crystal layer inside the sealing material after forming the spacers;

completely closing the liquid crystal layer and the sealing material with a second substrate after dripping the liquid crystal material so that a space surrounded by the first substrate, the second substrate and the sealing material is filled with the liquid crystal material; and cutting the first substrate and the second substrate after attaching the second substrate to the first substrate.

30. The method according to claim 29, further comprising the step of forming an overcoat film over the color filter.

31. The method according to claim 29, further comprising the step of forming an orientation film over the electrode pattern.

32. The method according to claim 1, wherein the spacers are formed by spraying the spacers.

33. The method according to claim 6, wherein the spacers are formed by spraying the spacers.

34. The method according to claim 11, wherein the spacers are formed by spraying the spacers.

35. The method according to claim 24, wherein the spacers are formed by spraying the spacers.

36. The method according to claim 27, wherein the spacers are formed by spraying the spacers.

37. The method according to claim 31, wherein the spacers are formed by spraying the spacers.

38. The method according to claim 32, wherein the spacers are formed by spraying the spacers.

39. The method according to claim 33, wherein the spacers are formed by spraying the spacers.

40. The method according to claim 34, wherein the spacers are formed by spraying the spacers.

41. The method according to claim 35, wherein the spacers are formed by spraying the spacers.

42. The method according to claim 36, wherein the spacers are formed by spraying the spacers.

43. The method according to claim 1, further comprising the step of rubbing a surface of the orientation film.

44. The method according to claim 6, further comprising the step of rubbing a surface of the orientation film.

45. The method according to claim 11, further comprising the step of rubbing a surface of the orientation film.

46. The method according to claim 26, further comprising the step of rubbing a surface of the orientation film.

47. The method according to claim 27, further comprising the step of rubbing a surface of the orientation film.

48. The method according to claim 28, further comprising the step of rubbing a surface of the orientation film.

49. The method according to claim 31, further comprising the step of rubbing a surface of the orientation film.

50. The method according to claim 1, wherein the first substrate and the second substrate are flexible.

51. The method according to claim 6, wherein the first substrate and the second substrate are flexible.

52. The method according to claim 11, wherein the first substrate and the second substrate are flexible.

53. The method according to claim 19, wherein the first substrate and the second substrate are flexible.

54. The method according to claim 22, wherein the first substrate and the second substrate are flexible.

55. The method according to claim 26, wherein the first substrate and the second substrate are flexible.

56. The method according to claim 27, wherein the first substrate and the second substrate are flexible.

57. The method according to claim 28, wherein the first substrate and the second substrate are flexible.

58. The method according to claim 29, wherein the first substrate and the second substrate are flexible.

* * * * *

UNITED STATES PATENT AND TRADEMARK OFFICE

CERTIFICATE OF CORRECTION

PATENT NO. : 8,493,542 B2
APPLICATION NO. : 11/023549
DATED : July 23, 2013
INVENTOR(S) : Takeshi Nishi et al.

It is certified that error appears in the above-identified patent and that said Letters Patent is hereby corrected as shown below:

In the Claims:

Col. 4, line 16, “further comprising a step of” should read “further comprises a step of”

Col. 4, line 38, “further comprising a step of” should read “further comprises a step of”

Col. 5, line 31, “applying spacers over the first substrate” should read “forming spacers over the first substrate”

Col. 6, line 66, “The method according to claim 24,” should read “The method according to claim 19,”

Col. 7, line 1, “The method according to claim 27,” should read “The method according to claim 22,”

Col. 7, line 3, “The method according to claim 31,” should read “The method according to claim 26,”

Col. 7, line 5, “The method according to claim 32,” should read “The method according to claim 27,”

Col. 7, line 7, “The method according to claim 33,” should read “The method according to claim 28,”

Col. 7, line 9, “The method according to claim 34,” should read “The method according to claim 29,”

Col. 7, line 11, “The method according to claim 35,” should read “The method according to claim 30,”

Col. 7, line 13, “The method according to claim 36,” should read “The method according to claim 31,”

Signed and Sealed this
Fifth Day of November, 2013

Teresa Stanek Rea
*Deputy Director of the United States Patent and Trademark Office*